Dec. 27, 1927.
C. A. BALLREICH
1,653,978
ICE CREAM FREEZER
Filed Feb. 9, 1926
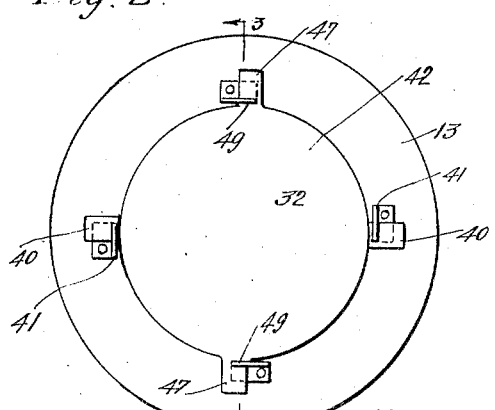
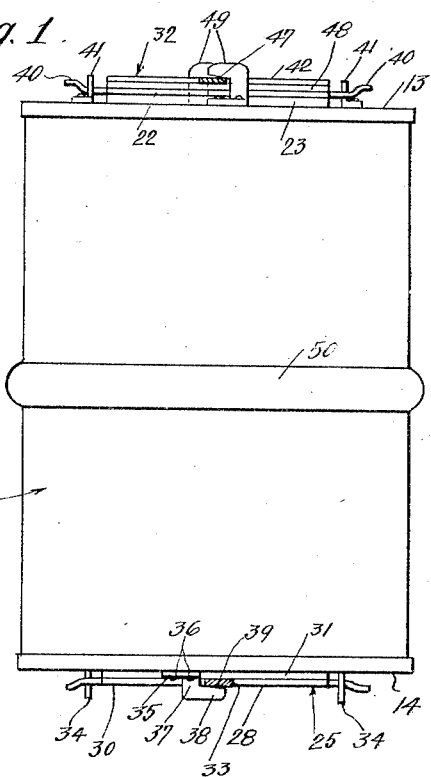
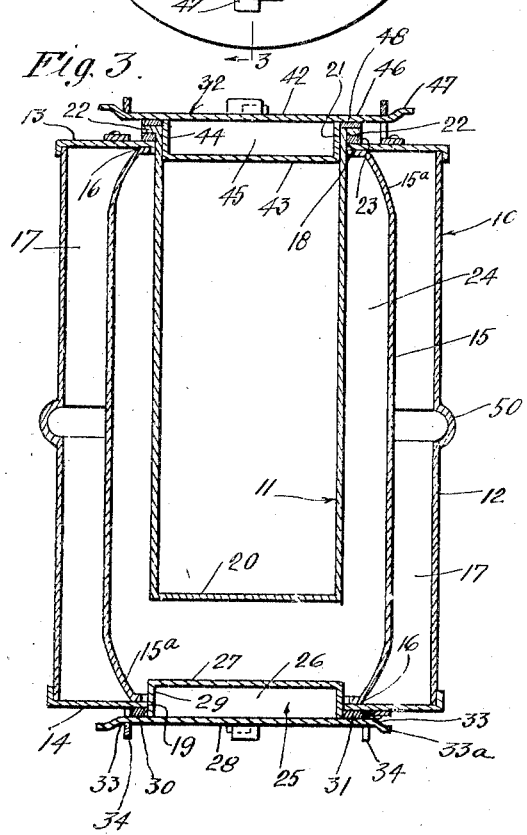
Inventor
Charles A. Ballreich
Attorney.

Patented Dec. 27, 1927.

1,653,978

UNITED STATES PATENT OFFICE.

CHARLES A. BALLREICH, OF LOS ANGELES, CALIFORNIA.

ICE-CREAM FREEZER.

Application filed February 9, 1926. Serial No. 86,982.

This invention has to do generally with ice-cream freezers and is more particularly concerned with invertible type freezers, that is, freezers which include casings opening at one end for the introduction and removal of a freezing mitxure, and opening at the other end for the introduction of the mixture to be frozen and subsequent removal of the frozen mixture; the freezers being invertible whereby the opening at either end may be rendered accessible.

Such a structure embodies the use of an internal cream container or cylinder whose openable end is accessible from one end of the casing of the freezer while the closed end of the cylinder is opposite but spaced from that end of the casing through which the freezing mixture is introduced. This spacing is provided in order that the freezing mixture (for instance, ice and salt) may be passed into and packed within the annular compartment defined by the ice cream cylinder and the casing.

In the usual freezer of this type, the open end of the ice cream cylinder is secured to the outer casing, and since the annular space between casing and cylinder extends substantially the length of the casing and is of comparatively little width, it is almost impossible thoroughly to clean or dry the walls defining this space, especially near the joint between casing and cylinder. This not only leads to a condition which is unsanitary, but is also harmful to the freezer, for the corrosive action of such brine as may be left in the freezer between periods of operation is rapid and the usful life of the freezer is therefore materially reduced.

Furthermore, with the cylinder rigidly attached to the casing, the entire freezer must be handled each time ice cream is ladled therefrom, and while the cylinder is being cleaned. The freezer being comparatively bulky and heavy, this necessity requires of the user very considerable wasted effort, and since freezers of this type are primarily intended for home use and hence must often be handled by women, the difficulty of handling them often precludes their use.

Therefore, it is among the objects of the present invention to provide a freezer of the general type described above, but which shall have none of the disadvantageous features mentioned. To this end, I have constructed the freezer so the ice cream cylinder is readily removable from the casing. Then when ice cream is to be ladled from the cylinder, the cylinder only need be handled. Or, after the cream container is withdrawn from the freezer, it may be very slightly warmed to free the frozen cream from the sides thereof, whereupon the entire block of cream may be slipped out in the form of a solid cylinder and cut into slices for the table. Naturally, with the cylinder and casing separable, both may be cleaned, scalded, and dried easily and with thoroughness.

The manner of detachably connecting the cylinder to the casing, the preferred type of closures for the casing and cylinder openings, and other objects and novel features of the invention may be described to better advantage in connection with the following detailed specification, reference being made to the accompanying drawings, in which:

Fig. 1 is a side elevation of a freezer embodying my invention, certain of the lock wings being shown in section;

Fig. 2 is a top, plan view thereof; and

Fig. 3 is a section on line 3—3 of Fig. 2.

In the drawings, I have shown a freezer made up primarily of a cylindrical casing 10 and a cream container or cylinder 11 which is adapted to be detachably held within the casing and in coaxial relation therewith. It is highly desirable, though not essential to the invention as considered in its broader aspects, that the casing have the properties of a heat insulator and this condition may be brought about in any suitable manner. For instance, the casing may be of double wall construction with a layer of cork or the like interposed between the walls. Or, as shown in the drawings, the casing may be made up of an outer wall or shell consisting of tube 12 and end rings or heads 13, 14 and an inner wall or shell 15, the ends 16 of shell 15 being soldered or otherwise suitably sealed to plates 13, 14 so a dead air, heat insulating space 17 is provided.

Heads 13 and 14 are centrally apertured to provide mouths 18 and 19, mouth 19 preferably being somewhat larger than mouth 18 and providing an opening through which the freezer is charged with the freezing mixture. Therefore, mouth 19 may hereinafter be referred to as a "charging mouth."

Cream cylinder 11 has a closed end 20, while its open end 21 is provided with an external peripheral flange 22. The cylinder is of such diameter that it may easily be passed through mouth 18 to and from the position indicated in Fig. 3, flange 22, however, being of such diameter that it well overhangs head 13 about the mouth 18. Preferably, there is provided a gasket 23 around the cylinder between head 13 and flange 22.

The inner shell or wall 15 of casing 10 is of such diameter throughout the major portion of its longitudinal extent, that it defines a sizeable annular chamber 24 about cylinder 11 when said cylinder is in the position of Fig. 3. This chamber is for the reception of the freezing mixture which is introduced thereto through charging mouth 19. Preferably, though not necessarily, ends 15$^a$ of shell 15 curve inwardly towards mouths 18 and 19, thus rendering it more easily possible to seal the connection between said ends and heads 13, 14 (since this sealing is sometimes done through the mouths) and also eliminating sharp corners wherein brine or foreign matter may gather between periods of operation, or, in other words, rendering it more easily possible to clean and dry the inner wall of the casing thoroughly.

Mouth 19 is adapted to be closed by a removable cap 25. This cap is preferably of double wall construction, there being a dead air space 26 between walls or disk-like plates 27 and 28 to act as a heat insulator. Plates 27 and 28 are joined by ring 29 which is adapted to fit within mouth 19 as a plug. Outer plate 28 has an annular flange 30 extending beyond ring 29 and a gasket 31 on ring 29 is adapted to be pressed between flange 30 and head 14 to make a tight closure between the cap and the casing. While any suitable means may be used for pressing the cap tightly upon the end plate and for holding it detachably in such a position, I prefer to use the wing and keeper device illustrated, this being an efficient yet relatively cheaply constructed expedient. This wing and keeper construction provided in connection with wall 14 and cap 25 is typical of the locking means employed for holding cylinder 11 within the casing and for holding the cap 32, cylinder 11 and casing 10 detachably in assembly, therefore, the following description of a single wing and keeper lock will suffice. There are preferably four locking elements or wings 33 which extend radially from flange 30 and are preferably angularly spaced about 90°, while complementarily spaced opposed locking elements or keepers 34 are secured to end plate 14. Each of these keepers is shown as being made up of a base 35 secured at 36 to plate 14, and an upright portion 37 turned outwardly from the base and having a horizontally extending tongue portion 38 which provides an inwardly facing shoulder 39 spaced from head 14 and inclining from the tip of the tongue toward the base and standard portions. The tongues of a given pair of keepers point in opposite directions so wings 33 may be simultaneously swung beneath or from beneath the tongues by rotation of the cap, wings 33 preferably being curved away from end 14 as at 33$^a$ whereby they may be more readily grasped for manipulation. Due to the inclination of shoulders 39, the further the wings are rotated beneath the tongues, the tighter will gasket 31 be pressed beneath flange 30 and head 14 and the wings are, of course, frictionally held from unintentional disengagement from the keepers.

Flange 22 of cylinder 11 is provided with diametrically opposite wings 40 which are similar to wings 33 and are adapted to be rotated into and out of engagement with keepers 41 which are secured to head 13 and are similar to keepers 34. By rotatively engaging keepers 41 and wings 40, gasket 23 is compressed between head 13 and flange 22 to insure a tight joint.

Cap 32 for cylinder 11 is preferably constructed similarly to cap 25, disk-like plates 42 and 43 being spaced apart by ring 44 to provide heat insulating space 45 and plate 42 having a flange 46 from which extend diametrically opposite radial wings 47 which are similar to wings 33. A gasket 48 on ring 44 is adapted to be compressed between flanges 46 and 23 when wings 47 are rotated into engagement with keepers 49, the latter being similar to keepers 34. Ring 44, of course, fits comparatively snugly within cylinder 11. Keepers 41 and 49 are preferably angularly spaced 90°.

Thus, it will be seen that the cylinder is held to the casing by detachable means which are independent of the means for holding the cap 32 to the cylinder, but it will be understood that in certain situations, I may rely only upon keepers 49 and wings 47 for holding the casing, cylinder and cylinder cap 32 in assembly, since pressure tending to hold the cap closely against cylinder flange 22 also tends to hold said flange against head 13. However, it is preferable that independent means be provided for holding the cylinder and cap in order that the cylinder may not become accidentally displaced when cap 32 is removed therefrom.

It will be seen that the cylinder may be readily and quickly connected to or detached from the casing so both casing and cylinder may be easily cleaned and dried with thoroughness and so cream may be removed from the cylinder without the necessity of handling the casing. With both the cylinder and cap 25 removed, it will be seen that the entire interior of the casing is accessible for the cleaning and drying operation.

When the cylinder is in place with the casing, it will be seen that due to the flange and gasket connection therebetween, there is no likelihood of the brine becoming accidentally mixed with the contents of the cylinder, even when the freezer is inverted during or after the introduction of a freezing mixture to chamber 24.

In order that the freezer may be easily turned end for end and carried from place to place, I preferably provide an annular bead or rib 50 about casing 10, this bead being most easily formed by pressing shell 12 outwardly as clearly shown in Fig. 3.

The keepers at opposite ends of the casing provide legs for the freezer in either of its two positions, and by holding the casing heads and closure caps slightly elevated above the floor or supporting base, do much to protect said heads and caps, as will be readily understood.

It will be understood the drawings and description are to be considered merely as illustrative of and not restrictive on the broader claims appended hereto, for various changes in design, structure and arrangement may be made without departing from the spirit and scope of said claims.

I cliam:

1. In an ice cream freezer, a casing, top and bottom heads for the casing, each of said heads having openings therein, a cream container having an open end removably mounted in said casing and spaced from the side and bottom to provide a freezing mixture space, the container being of such size as to pass through the opening in the top head of the casing, a flange on the container adapted to rest on the top head of the casing, a closure for the open end of the container, and fastening means on the exterior of the top head of the casing cooperating with the container flange and with the closure for holding the container in the casing and fastening the cover thereon.

2. In an ice cream freezer, an outer casing having an opening at both ends, a removable cream container having a flange at its upper end adapted to be inserted into the casing through the opening in one end with its flange resting on the top of the casing, and its side and bottom walls spaced from the casing, a closure for said container, pairs of lugs carried by said container flange and said closure, and latch members carried by said casing top and cooperating with the lugs on the container flange and the closure for holding the same in position.

In witness that I claim the foregoing I have hereunto subscribed my name this 13th day of January, 1926.

CHARLES A. BALLREICH.